United States Patent Office 3,501,552
Patented Mar. 17, 1970

3,501,552
PHENOLIC BENZYLIC ETHER COATING COMPOSITIONS AND METHOD OF CROSSLINKING SAME
Janis Robins, St. Paul, Minn., assignor to Ashland Oil & Refining Company, Ashland, Ky., a corporation of Kentucky
No Drawing. Continuation-in-part of application Ser. No. 536,180, Mar. 14, 1966. This application Jan. 10, 1969, Ser. No. 790,473
Int. Cl. C08g 5/06, 5/10
U.S. Cl. 260—831
11 Claims

ABSTRACT OF THE DISCLOSURE

Tough, flexible, solvent resistant phenolic coatings are produced by heating optionally in the presence of a weak acidic or basic catalyst a coating composition containing a benzylic ether resin whereby formaldehyde is split from the benzylic ether resin and is utilized to crosslink the resulting methylene linked phenolic resin.

This invention relates to phenolic coatings which are crosslinked and yet flexible, tough, and solvent resistant More specifically, the invention relates to coating compositions containing a benzylic ether resin, which compositions are used to form the phenolic resin coatings.

This application is a continuation-in-part of my earlier filed United States application, Ser. No. 536,180, filed Mar. 14, 1966.

In the past phenolic coatings have been produced by initially producing phenol formaldehyde resins and thereafter crosslinking the resins. The phenolic coatings which were produced in such previously used processes did not achieve the desired flexibility or solvent resistance required by modern standards.

Phenolic resins, while constituting one of the well-known classes of curable resin compositions useful as binders and coatings, have been at a relatively stable point of development since the early "Bakelite" developments of Union Carbide Corporation.

Phenolic resins obtained by the condensation of a phenolic compound with an aldehyde are generally divided into two categories: (1) the "novolac" resins and (2) the "resole" or A-stage resins or more highly polymerized derivatives of resoles, the "resitole" or B-stage resins.

Novolac resins are permanently soluble stable resins in which the polymer chains have phenolic end groups and methylene bridges between phenolic nuclei. They can be cured to insoluble, infusible products upon the addition of a source of formaldehyde, such as hexamethylenetetramine or paraform. Novolac resins have been traditionally prepared by reacting phenol and formaldehyde in the presence of acid catalysts employing an excess of phenol.

The novolac resins are phenolic resin in which these phenolic nuclei are joined by methylene bridges located at the ortho and para-positions relative to the phenolic hydroxyl group. It is generally accepted that conventional acidic catalysts used to form the novolacs produce phenolic resins with a predominance of 4,4' and 4,2' linkages, although some 2,2' linkages are also formed. Recently novolac resins have been prepared which contain significant proportions of 2,2' linkages using metal oxides or metal salt catalysts. This polymerization process is frequently referred to as an "ionic" polymerization. These "ortho" resins cure faster and produce crosslinked phenolic resins of improved mechanical properties. Theoretically, the difference in properties is traceable to the more ordered structure of the polymer molecule which is obtained with 2,2' linkages. The formation of phenolic resins of this type have, however, been limited to methods in which an excess of phenol is employed which is necessary to prevent gelation of the resins during polymerization.

Resole, A-stage, and resitol, B-stage, resins are prepared generally using an alkaline catalyst with excess formaldehyde and the resultant resins have pendant methylol groups, methylene bridges, and random location of the bridges. In the resitole B-stage, the resins exhibit higher molecular weights and some crosslinking and are characterized by high viscosity. Since each methylol group in these resins constitutes a potential crosslinking site, the resitole resins are more readily converted to the crosslinked infusible phenolic resins by heating. However, these resins are highly unstable. Since these resole and resitole resins have both 4,4' and 2,2' linkage, they were generally more desirable for use in phenolic coating compositions.

Previously used coating compositions which contain either the resole or resitole resins or the novolac resins are not satisfactory since they are brittle and inflexible.

It is believed that the deficiencies of the previously used coating compositions primarily characterized by the brittle nature of the phenolic coatings are produced from the linkage of phenolic groups at random positions, that is, at the ortho-, meta-, and parapositions, indiscriminately.

Resole type resins suffer from another disadvantage in that they are not compatible with solvents, thus making them difficult to apply. A disadvantage of the novolac resins is that crosslinking requires the presence of an external source of formaldehyde and a strong catalyst. This produces uncontrollable crosslinking wherein a brittle phenolic coating results.

Thus, it is clear that prior art phenolic coatings are generally unsatisfactory, and coating compositions have been modified by epoxy resins to produce commercially acceptable flexible, tough, solvent resistant phenolic coatings.

Accordingly, it is a primary object of the present invention to provide a novel process for producing phenolic coatings.

It is another object to provide a novel process for curing a benzylic ether resin to produce strong, flexible, solvent resistant phenolic coatings.

Another object of the present invention is to provide a durable and economical phenolic coating.

Still another object of the invention is to provide novel coating compositions based on a benzylic ether resin utilized as a reagent.

Yet another object of the invention is to provide coating compositions which may be applied to metallic and non-metallic substrates.

Other objects and advantages of the invention will become apparent from the following description and appended claims.

According to this invention, benzylic ether resins are crosslinked to produce phenolic coatings. Curing is achieved by heating to a temperature of about 400° F. for approximately 5 minutes. Temperatures can range from 300–500° F. and baking times from 2 to 7 minutes. The benzylic ether resin can be heated either alone or in the presence of a solvent such as butanol or Solvesso–100, a commercially available hydrocarbon solvent, in sufficient quantity to supply an 80% solution. Additionally, it is possible to blend the phenolic resins with compatible resins such as epoxy resin, e.g. Epon 1007, or rubbers, e.g. butyral rubber. To increase the curing rate and to control the amount of crosslinking, weak acids and weak bases can be utilized. Alternatively, strong catalysts can be used and are, in fact, preferred when the benzylic ether resin is blended with a compatible resin. It is important to use only weak acid with unblended benzylic ether resins since strong acids or strong bases will produce too many crosslinking bridges, thereby producing brittle resins.

In the coating compositions according to this invention, the preferred benzylic ether resins are those having average degrees of polymerization, as measured by the number of repeating aromatic rings, of at least 3 and generally not above 100. Although higher molecular weight resins are operable in the curing reactions, such resins are difficult to handle from the standpoint of viscosity in requiring excessive amounts of solvent to bring the viscosity of the resin component to a level normally desired in coating applications. Even if the benzylic ether type linkage is not completely present when the initial polymerization occurs, the resins are still useful herein. Other linkages, e.g. methylene linkage, will inherently be present; however, the proportions can be controlled to a minimum as will be discussed hereinafter.

Recently, as disclosed in my earlier filed parent application, a novel benzylic ether type resin has been developed. This resin contains repeating units which correspond to the following structural formula:

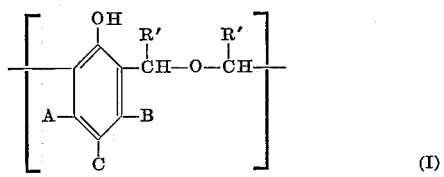

(I)

wherein A, B, and C are hydrogen, hydrocarbon radicals, oxyhydrocarbon radicals, or halogen; and R' is a hydrogen or a hydrocarbon radical of 1 to 8 carbon atoms. As can be seen, this basic improvement in the resin art provides a useful new resin which is essentially the only new resin produced in many years.

It is now known that the novel benzylic ether resins having ortho, ortho' or 2,2' linkages form extremely stable resins which are characteristic of the novolac type resins and simultaneously form highly reactive resins which are characteristic of the resole type resins. Thus, the present invention not only utilizes the extreme stability of the molecular orientation, but further utilizes an inherent source of formaldehyde due to the benzylic ether linkage which may split out formaldehyde upon heating. Thus, the formaldehyde which is split out is available to act as a crosslinking agent. As noted above, the crosslinking should occur at the para- or 4-position, thus forming extremely oriented and stable molecules. The degree of crosslinking is also important to insure flexibility of the resulting cured resin. If too many crosslinking sites are utilized, the resin becomes brittle and, thus, is imperfect and not suited for many potential uses. Conversely, if weak catalysts are used or if blends are used, the amount of crosslinking can be controlled in accordance with this invention, and the position of the crosslinking can be controlled, thus giving not only strong (oriented) resins, but also flexible (controlled crosslinking) resins and solvent resistant resins.

Other novel combinations of characteristics of the novolac and resole resins are apparent in the benzylic ether type structures which make them particularly adapted for the present use in forming phenolic coatings. Specifically, the high molecular weight and yet high fluidity achievable in the novel benzylic ether resins is of particular importance. Contrary to resitol resins, high molecular weight fusable resins which are generally unstable, these high molecular weight benzylic ether resins are stable and have long shelf lives. Similarly, novolac resins are required a source of formaldehyde before curing or crosslinking occurs. However, the present invention utilizes benzylic ether resins which inherently contain a supply of formaldehyde. Both the degree of polymerization and the extent of dimethylene ether linkage formed in the benzylic ether resins can be controlled by the conditions used in forming the said resins.

This latter feature forms an essential part of the present invention since heating in the presence of weak catalysts such as weak acids or weak bases causes condensation of formaldehyde from the methylol groups attached to the phenolic nuclei, thereby providing a source of formaldehyde available to crosslink the resin chains in a controlled manner. Heat alone is sufficient to cause crosslinking; however, the addition of catalysts can affect the amount of crosslinking and can substantially increase the rate of crosslinking (curing).

As noted above, coating compositions containing phenolic resins have been used but have been unsatisfactory because they produce phenolic coatings that are brittle or inflexible. This is believed to result from the excess of crosslinking which occurs and from using a methylene linked phenolic resin for the initial starting component. Further, the random substitution of the methylene bridges in the phenolic resin contributes to the inflexibility and brittleness of the resin.

The present invention is based on the ability to control the linkages of the cured phenolic coatings by utilizing as starting components benzylic ether resins. Not only does the benzylic ether resin supply an inherent source of formaldehyde which serves as a crosslinking agent, but it also enables the controlled crosslinking of phenolic nuclei which results in non-brittle, flexible, tough, solvent resistant phenolic coatings. As noted above, the molecular orientation of benzylic ether resins is that of dimethylene ether substituents in the ortho,ortho' positions whereby crosslinking sites occur at the terminal methylol groups and at the para-position of the phenolic nuclei by condensation.

The described benzylic ether resins are condensation polymers of a phenol having the general formula:

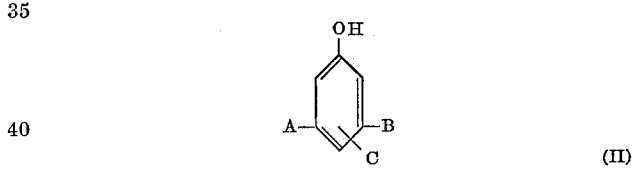

(II)

wherein A, B, and C are hydrogen, hydrocarbon radicals, oxyhydrocarbon radicals, or halogen with an aldehyde having the general formula R'CHO wherein R' is a hydrogen or a hydrocarbon radical of 1 to 8 carbon atoms. The benzylic ether resin is prepared in the liquid phase in the substantial absence of water at temperatures below about 130° F. in the presence of catalytic concentrations of a metal ion dissolved in the reaction medium. The preferred metal ions are divalent metal ions such as zinc, cadmium, manganese, copper, tin, magnesium, cobalt, lead, calcium, and barium.

As noted above, the benzylic ether resins are extremely stable at room temperatures for long periods of time as is typical of novalac resins; however, they are extremely active in the presence of an acidic reagent at room temperatures or at elevated temperatures, which characteristic is typical of resole resins. The novel characteristics of the benzylic ether resins are due, presumably, to the ether linkage. In addition, the characteristics are affected by the existence of a large number of methylol groups, the ortho,ortho' or 2,2' linkages on the phenol, the unsubstituted para-position, and the methylene ether linkages. The novel phenolic resins have at least one terminal methanol group per resin molecule and preferably a majority of resin molecules will have two such groups. The novel phenolic resins can be crosslinked by heating, as shown below.

Although the benzylic ether resins are described principally in terms of phenol and formaldehyde which are the preferred starting materials, it is also possible to prepare benzylic ether resins from meta substituted phenols which contain substituents of the type heretofore found in phenols employed in reactions with aldehydes such as lower alkyl groups, halogens, alkoxy groups, mercapto groups, and the like. Particular examples of such phenols include: 3 - methylphenol, 3 - propylphenol, 3 - isobutylphenol, 3 - methoxyphenyl, 3 - bromophenol, 3 - ethoxyphenol, 3 - chlorophenol, 3 - methylthiophenol, and the like. Additionally, instead of formaldehyde, other aldehydes such as acetaldehyde or propionaldehyde can be used. Polymer formation occurs principally at temperatures above 100° C., preferably from 110–120° C. Although the process can be carried out above 130° C., significant rearrangement of the resulting benzylic ether polymer to a methylene bridged phenolic resin occurs. Thus, to obtain the initial benzylic ether resin which may be used in the novel coating compositions, the higher temperature should be avoided. In forming the benzylic ether resins, the process should be conducted under substantially anhydrous conditions. That is, less than 5% by weight of water should be present. This requires, of course, a continuous removal of water. If the water is not removed, the reaction product cannot be cured to mechanically strong resins by the use of acidic reagents at room temperatures. It is believed that the presence of water permits para-substitution and also poisons the catalyst.

Other phenols useful in the preparation of the resin include substituted phenols such as alkyl substituted phenols, aryl substituted phenols, cycloalkyl substituted phenols, alkenyl substituted phenols, alkoxy substituted phenols, aryloxy substituted phenols, and halogen substituted phenols. Except for the halogen substituted phenols, the substituent should contain from 1 to 26 and preferably 1 to 6 carbon atoms. Specific examples are: cresol, 3,5-xylenol, 2,3,4 - trimethylphenol, 3 - ethylphenol, 3,5 - diethylphenol, butylphenol, 35 - dibutylphenol amylphenol, cyclohexylphenol, octylphenol, 3,5 - dicyclohexylphenol, phenylphenol, crotonylphenol, 3,5 - dimethoxyphenol, 3,4,5 - trimethoxyphenol, ethoxyphenol, butoxyphenol, 3 - methyl - 4 - methoxyphenol, and phenoxyphenol. In general, any phenolic composition having substituents in the para- or meta-positions which substituents are hydrogen, hydrocarbon radicals, oxyhydrocarbon radicals, or halogen may be used. It is preferred that the ortho and para positions be initially unsubstituted.

The aldehydes used include any aldehyde heretofore employed in the formation of phenolic resins, for example formaldehyde, acetaldehyde, propionaldehyde, furfuraldehyde, and benzaldehyde. Generally, the aldehyde should contain 1 to 8 carbon atoms. The ratio of aldehyde to phenol employed should be at least 1 and preferably in the range of 1½ to 3:1. The use of diluents during the reaction allows better control over the reaction. Suitable diluents are non-polar organic solvents which are liquid at room temperature and have boiling points preferably below 130° C., for example aliphatic, cycloaliphatic, aromatic and halogenated hydrocarbons, as well as ethers, esters, and ketones. Specific examples are: benzene, toluene, xylene, dioxane, acetone, tetrahydrofuran, ethylacetate, and 1,2-dichloroethylene.

As catalysts, metal ions are desirable, e.g. metal salts. Preferred salt radicals are carboxylates of hydrocarbon acids. The above-noted metals having divalent nature can be used; similarly, monovalent or trivalent metal ions or higher valence state metals can be used.

The present invention resides in a novel curing process wherein the above-described benzylic ether resins are applied as coating compositions to a substrate in the presence or absence of an organic solvent, in the presence or absence of compatible resins and in the presence or absence of a catalyst chosen as a function of the type resin-blend being applied. The thus coated substrate is then baked at approximately 200–500° F., preferably 400° F., for a period of time up to 30 minutes, preferably 3 to 10 minutes. The resulting phenolic coating comprises a controllably crosslinked resin which is tough, flexible, and solvent resistant.

More specifically, the benzylic ether resins formed from the above-noted phenols and aldehydes may be described as phenolic resins having the general formula

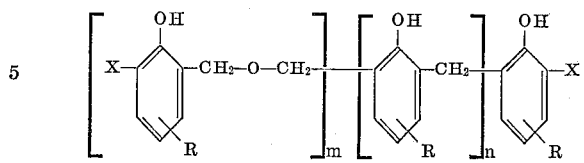

wherein R is hydrogen or a phenolic substituted meta to the hydroxyl group of the phenol, $m$ and $n$ are numbers the sum of which is at least 2 and the ratio of $m$-to-$n$ is at least 1, and wherein X is a hydrogen or a methylol group, the ratio of said methylol group-to-hydrogen being at least 1. This, of course, recognizes that not all the phenolic nuclei will be joined by methylol bridges and that not all the terminal units are methylol.

The invention is further illustrated in the following examples.

EXAMPLE 1

A glass reaction vessel is equipped with an agitator, a reflux condenser, and a thermometer. Into the reaction vessel is charged 252 g. (3 moles) of phenol, 90 g. (3 moles) of p-formaldehyde, 2 g. of zinc naphthanate, and 100 ml. of benzene. The reaction mixture is slowly heated to reflux which occurs at about 110° C. The paraform dissolves rapidly at reflux. Reflux is continued for 6 hours and about 30 ml. of water (1.5 moles) is removed. Upon continued heating to 120° C., no significant amount of water distills out. The product is recovered from the reaction vessel and cooled to room temperature. The product is subjected to steam distillation to remove untreated phenol. This treated product is analyzed by infrared spectroscopy and nuclear magnetic resonance, and the analysis indicates a product which is predominantly a dimethylene ether-bridged phenolic polymer.

EXAMPLE 2

About 25 g. of the benzylic ether resin prepared in Example 1 was drawn onto an untreated steel plate to produce a 1 mil thick coating. The plate was placed in an oven maintained at 400° F. for three minutes. The baked coating was submitted to a one minute rub with acetone and all the film was removed, indicating no solvent resistance in the phenolic coating. The flexibility of the product was good when tested by the conical mandrel bend test.

EXAMPLE 3

The procedure of Example 2 was repeated using a four minute baking cycle. The baked coating had good flexibility but about half the film was removed by the acetone rub.

EXAMPLE 4

The procedure of Example 2 was repeated using a five minute baking period. The baked coating had good flexibility and was not visibly affected by an acetone rub.

EXAMPLE 5

About 25 g. of the benzylic ether resin of Example 1 was stirred into a beaker filled with sufficient butanol to give an 80% solution. About 1% of Ultra TX catalyst was stirred into the solution. This solution was drawn onto an untreated steel plate, and the plate was placed in an oven maintained at 400° F. for about 3 minutes. The baked coating was subjected to the solvent and conical mandrel flexibility test. The coating had poor flexibility, but was completely solvent resistant.

EXAMPLE 6

About 25 g. of the benzylic ether resin of Example 1 was placed in a beaker. About 2% of Ultra TX catalyst was stirred into the viscous polymer. This solution was drawn onto an untreated steel plate, and the plate was placed in an oven maintained at 400° F. for 4 minutes.

The baked coating was subjected to the test procedures of Example 2. The coating had poor flexibility, but was completely solvent resistant.

EXAMPLE 7

The procedure of Example 6 was repeated using 2% stannic chloride catalyst instead of Ultra TX catalyst. The baked coating had poor flexibility but good solvent resistance.

EXAMPLE 8

Example 5 was repeated using 2% stannic chloride catalyst instead of Ultra TX catalyst and using Solvesso-100 instead of butanol solvent. The baked coating had good flexibility but poor solvent resistance.

EXAMPLE 9

Example 5 was repeated using 2% trifluoroacetic acid instead of Ultra TX catalyst. The baked coating had poor flexibility and poor solvent resistance.

EXAMPLE 16

The procedure of Example 5 was repeated, using 2% dimethyltindichloride instead of Ultra TX. The baked product had poor flexibility and poor solvent resistance.

EXAMPLE 17

Example 16 was repeated, baking for four minutes. The baked coating had good flexibility and superior solvent resistance.

EXAMPLE 18

Example 17 was repeated, using 2% dibutyltin dilaurate instead of dimethyltindichloride. The baked coating had good flexibility but no solvent resistance.

The results of Examples 2 through 18 showing the effect of acidic catalysts are presented in Table I. The solvent resistance is rated from 0 (very poor) to 10 (superior), and the flexibility is rated as G (good) or F (failure) as determined by the conical mandrel bend test.

TABLE I.—THE EFFECT OF ACIDIC CATALYSTS

| Catalyst | | Baked at 4000° F. (time, min.) | | | |
|---|---|---|---|---|---|
| Type | Amount, percent | 2 | 3 | 4 | 5 |
| None | | | G (0) | G (5) | G (9+) |
| Ultra TX³ | ¹1 | | F (10) | | |
| | 2 | | | F (10) | |
| Stannic chloride | ²2 | | F (9+) | | |
| | ²2 | | | G (6) | |
| Trifluoroacetic acid | 2 | | F (2) | | |
| | 4 | | | F (1) | |
| n-Butyltintrichloride | ²2 | | G (9+) | G (10) | |
| | 2 | G (6) | G (10) | | |
| Dimethyltindichloride | ¹2 | | F (1) | | |
| | ²2 | | F (2) | G (10) | |
| Dibutultin dilaurate | 2 | | | G (0) | |

¹ Film applied from an 80% solution in butanol.
² Film applied from an 80% solution in "Solvesso-100"
³ Para-Toluene sulfonic acid.

EXAMPLE 10

Example 5 was repeated using 4% trifluoroacetic acid instead of Ultra TX catalyst. The baked coating had poor flexibility and poor solvent resistance.

EXAMPLE 11

The procedure of Example 8 was repeated using 2% n-butyltin trichloride instead of stannic chloride catalyst. The baked coating had good flexibility and good solvent resistance.

EXAMPLE 12

Example 11 was repeated baking for four minutes rather than three minutes. The product had good flexibility and superior solvent resistance.

EXAMPLE 13

About 25 g. of the benzylic ether resin of Example 1 was placed in a beaker and 2% n-butyltintrichloride was stirred therein. This solution was drawn onto an untreated steel plate and placed in an oven maintained at 400° F. for two minutes. The baked coating had good flexibility and fair solvent resistance.

EXAMPLE 14

Example 13 was repeated, baking for three minutes. The baked coating had good flexibility and superior solvent resistance.

EXAMPLE 15

The procedure of Example 13 was repeated, using 2% dimethyltindichloride instead of n-butyltintrichloride and baking for three minutes instead of two minutes. The baked product had poor flexibility and very poor solvent resistance.

EXAMPLE 19

About 25 g. of the resin of Example 1 was stirred into a beaker containing enough butanol to give an 80% solution. This solution was drawn onto an untreated steel plate, and the steel plate was placed in an oven maintained at 300° F. for seven minutes. The baked coating was subjected to the test procedures of Example 2. The baked coating had good flexibility, but no solvent resistance.

EXAMPLE 20

The procedure of Example 19 was repeated, but 2% n-butyltintrichloride was stirred into the resin solution before application to the plate, and the plate was baked for five minutes. The baked coating had good flexibility and medium solvent resistance.

EXAMPLE 21

Example 20 was repeated with 4% n-butyltintrichloride and the results were the same.

EXAMPLE 22

Example 21 was repeated, baking for seven minutes. The resulting product had good flexibility and good solvent resistance.

EXAMPLES 23 AND 24

The procedure of Example 19 was repeated using 2% nonylphenol sulfonic acid and making for three minutes. The baked coating failed the flexibility test but had superior solvent resistance. Repeating the example, but baking for four minutes produced the same results.

EXAMPLES 25–28

The procedure of Example 19 was repeated using 2% antimony trichloride and baking for one minute. The baked coating had good flexibility but no solvent resistance. Repeating the example, but baking for two minutes, three minutes, and four minutes, all produced identical products failing the flexibility test but having superior solvent resistance.

Examples 19 through 28 are summarized in Table II wherein legends used in Table I apply.

TABLE II.—THE EFFECT OF ACIDIC CATALYSTS [1]

| Catalyst | | Baked at 300° F. (time min.) | | | | | | |
|---|---|---|---|---|---|---|---|---|
| Type | Amount, percent | 1 | 2 | 3 | 4 | 5 | 6 | 7 |
| None | | | | | | | | G (0) |
| n-Butyltintrichloride | 2 | | | | | G (5) | | |
| | 4 | | | | | G (5) | | |
| Nonylphenol sulfonic acid | 2 | | | F (10) | F (10) | | | |
| Antimony trichloirde | 2 | G (0) | F (10) | F (10) | F (10) | | | |

[1] Film applied from an 80% solution in butanol.

The following examples illustrate the effect of basic catalyst.

EXAMPLES 29–47

About 25 g. of the resin of Example 1 was applied to an untreated steel plate by the procedure of Example 5 but varying the catalyst and baking temperature. Table III represents a summary of the results of the test procedures according to Example 2 performed on this series of examples. By way of generalization, it can be seen that greater amounts of catalyst increase the solvent resistance of the finished product; and, generally, greater baking times increase the amount of solvent resistance. Apparently, the flexibility is dependent only upon the type of catalyst used and is not affected in these examples by the percentage of catalyst or time of baking.

EXAMPLE 57

About 25 parts of phenolic resin of Example 1 is heated to about 320° F. for about one hour. Further polymerization occurs. A resin solid at room temperature is obtained. The resin is fusible and thermoplastic in nature. Infrared spectroscopy and nuclear magnetic resonance analysis shows conversion of dimethylene ether linkage to methylene linkages. The resin is useful as a novolac resin and is characterized by an extremely high degree of ortho, ortho' linkages and can be rapidly cured with hexamethylene tetramine.

EXAMPLE 58

To 100 parts of the resin of Example 1 is added one part of paratoluene sulfonic acid. After a short induction period, an exothermic reaction develops, and a solid, infusible crosslinked resin is formed. Infrared spectroscopy and nuclear magnetic resonance analysis shows conversion of dimethylene ether linkages and methylol groups to methylene bridges and shows para-substitution to ortho-substitution on the phenol ring.

EXAMPLE 59

The procedure of Example 58 is repeated, using one part boron trifluoride dihydrate instead of the sulfonic acid. The same reaction occurs, and a crosslinked phenolic resin is obtained. The addition of the acidic catalyst results in a higher degree of crosslinking.

Since this invention relates to a thermosetting benzylic ether phenolic or its crosslinked, thermoset derivative, the resins are adapted for use in all conventional thermosetting phenolic applications, including application to plastics and glasses as well as metals. Specific but not exclusive uses are as laminating vanrishes, metal lacquers, interior can and drum coatings, spools and bobbins for textile machinery, linings for tanks and tank cars (e.g. those adapted to carry wine, beer, or liquor), industrial equipment, automobile enamels, electrical appliance enamels, linings for ash trays, and coatings for metal office and industrial equipment. Of course, pigments, fillers, preservatives, and

TABLE III.—THE EFFECT OF BASIC CATALYSTS [1,2]

| Catalyst | | Baked at 400° F. (time, min.) | | | |
|---|---|---|---|---|---|
| Type | Amount, percent | 2 | 3 | 4 | 5 |
| None | | | | G (0) | G (5) | G (9+) |
| N-ethylmorpholine | 10 | | | | G (7) |
| | 15 | | | | G (9) |
| Diethyl ethanolamine | 10 | | | | G (7) |
| | 15 | | | | G (8) |
| Tributylamine | 10 | | G (0) | | G (9) |
| Dabco [3] | 5 | F (10) | F (10) | | F (10) |
| | 10 | | | | F (10) |
| Tetramethyl guanidine | 10 | | | | F (10) |
| Ammonium hydroxide | 1 | | F (3) | F (7) | |
| | 2 | | F (3) | | |
| | 5 | | F (9) | | |
| | 10 | | F (10) | | |

[1] Film applied from an 80% solution in butanol.
[2] 80% solution in S-100.
[3] Triethylene diamine.

The following examples illustrate the effect of varying phenol formaldehyde ratios in the initial benzylic ether and the effect on the curing rate.

EXAMPLES 48–56

Using the procedure of Example 1, benzylic ether resins were prepared having varying phenol-formaldehyde ratios of reactants. These resins were applied by the procedure of Example 5 and were tested by the procedure of Example 2.

Using no catalyst and baking at 400° F., the following table, Table IV, illustrates that between 1.25 and approximately 1:5 phenol: formaldehyde ratio produces optimum solvent resistance. All products had good flexibility. Likewise, increasing the amount of making time tends to increase the solvent resistance but does not apparently affect the flexibility.

TABLE IV.—THE EFFECT OF F/Ph RATIO ON CURING

| Catalyst | Time (min.) | F/Ph | Baked at 400° F. | | | |
|---|---|---|---|---|---|---|
| | | | 1.25 | 1.35 | 1.45 | 1.65 | 1.75 |
| None | 3 | | G (0) | | | G (0) | |
| Do | 4 | | G (10) | | | G (5) | |
| Do | 5 | | G (10) | G (10) | G (10) | G (9+) | G (9+) | other additives may be added to the coating compositions. Further uses include applications involving insulating varnishes for coils, wire, and other electrical equipment. Among the methods of applying the phenolic coatings should be mentioned the alternate use of baking ovens for smaller objects or the use of a hot blast of air for larger articles not fitting within an oven. Conventional ovens or blast apparatuses are utilized for the baking operations.

The phenolic resins are resistant to weak acids, bases, and solvents and, accordingly, are useful in lining containerrs for soap solutions, alkalies, fruit juices, meats, fish, etc.

Generally, it may be said that they are useful whenever there is danger of solvent removing a coating or chemical attack upon a coating. It is not desirable to limit the invention in view of the wide applicability thereof; and, accordingly, the use of the steel plate in the above examples is intended merely to illustrate the preferred species. It is clear that its utility in coating metal adapts the phenolic resins of the present invention to be coated upon many substances such as automobile bodies; and, accordingly, the possibility of using the benzylic ether of the present invention to form phenolic enamel-like coatings on automobiles and other surfaces exposed to weather is at once apparent.

It is possible to apply the phenolic coating compositions to untreated steel plate and also to treated surfaces. Similarly, it is possible to apply second coatings upon the phenolic coatings after they have been applied; however generally, this is expensive and undesirable.

While the method of application of the coating has been illustrated as draw-downs from a solvent solution, it is clear that other methods of application could be utilized, such as applying without solvents vapor deposition, spraying, electrostatic attraction, etc., and many other conventional coating techniques may be used. The apparatus for applying the coating is not at all essential to the present invention, and, in the examples, a simple knife coater could be utilized.

While some of the benzylic ether resins were applied in organic solvents, it should be remembered that the cured product will be solvent resistant and that evaporation of solvent occurs during baking of the coating. The solvent may include any aliphatic, cycloaliphatic, or aromatic organic solvent with which the resin is compatible. Also, it is possible to blend the benzylic ether resins with compatible resins in forming coating compositions. For example, epoxy and epoxy modified substances may be used. Likewise, rubbers such as butadiene acrylonitrile rubber may be utilized. As noted above, blends will require strong catalysts. The blended element may comprise a comparable component and may be present in quantities up to about 30% by weight.

While the examples indicate that cure can be accomplished without catalysts, i.e., merely by the application of heat, it is further indicated that catalysts increase the rate of curing. It should be remembered that an unblended benzylic ether resin should be used only with "weak" catalysts if a superior flexibility is desired. Weak bases are those having a $pK_b$ value of about 4 to about 13. The $pK_b$ value is the negative logarithm of the dissociation constant of the base and is a well-known measure of the basicity of a basic material. The higher this number is, the weaker the base. Any base having $pK_b$ of 4 to 13 can be employed, although preferably bases are employed which have $pK_b$ values in the range of 7 to 11. The bases falling within this range are generally organic compounds containing one or more nitrogen or phosphorous atoms. Preferred materials are heterocyclic compounds containing at least one nitrogen atom in the ring structure. Specific examples of bases which have $pK_b$ values within the necessary range include N,N-diethyl-aniline, 4-alkyl pyridines wherein the alkyl group has 1 to 4 carbon atoms, isoquinoline, aryl-pyridines such as phenyl pyridine, pyridine, acridine, 2-methoxypyridine, pyridazine, 4-cyano pyridine, pyrimidine, pyrazine, tributyl phosphine, N-ethyl-morpholine, 4,4-dipyridine, phenylpropyl pyridine, alkyl substituted nitrogen oxides, 5-methyl pyrimidine, and pyridine N-oxide.

In view of the varying catalytic activity and varying catalytic effect desired, catalyst concentrations will vary widely. In general, the lower the $pK_b$ value is, the shorter will be the bench life of the composition and the faster and more complete will be the cure. Solvents and any acidity present in added ingredients such as sand may affect the catalytic activity. In general, however, catalyst concentrations will range from 0.01 to 10% by weight of the phenolic resin.

Weak acids are those having $pK_a$ value of about 4 to 13.

It is further to be remembered that blends of benzylic ether resins and, for example, epoxy resins require strong catalysts. "Strong" bases are those having a $pK_b$ value below about 4 and "strong" acids are those having $pK_a$ value below about 4.

Variations in the phenol:formaldehyde ratio are possibel in forming the benzylic ether resin adapted for use in the novel coating compositions. The results shown in Table IV indicate the preferred ratio, but other ratios may be used.

The temperature of baking (curing) can vary from about 275° F. to 500° F., but best results occur from about 375°–425° F.

The time of curing depends on the other process parameters such as presence and type of catalyst, temperature, etc. The examples indicate a minimum of two minutes is generally required and a maximum of seven minutes is generally sufficient.

The invention is not to be construed as limited to the particular form disclosed herein since these are to be regarded as illustrative rather than restrictive.

What is claimed is:

1. The process for curing phenol formaldehyde resins which comprises heating a benzylic ether resin at approximately 275°–500° F. for a period of time sufficient to obtain the desired degree of curing, wherein the benzylic ether resin has the general formula:

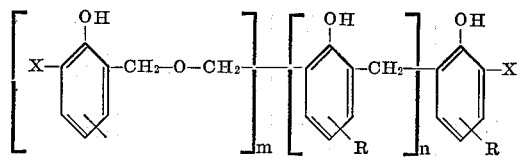

wherein R is hydrogen or a phenolic substituent meta to the hydroxyl group of the phenol, $m$ and $n$ are numbers the sum of which is at least 2, and the ratio of $m$-to-$n$ is at least 1, and wherein X is a hydrogen or a methylol group, the molar ratio of said methylol group-to-hydrogen being at least 1.

2. The process of claim 1 wherein a weak acidic or weak basic catalyst is utilized in catalytic amounts.

3. A process of curing a coating composition at a temperature of approximately 275° F–500° F., said composition comprising a benzylic ether resin and an organic solvent, wherein the benzylic ether resin has the general formula:

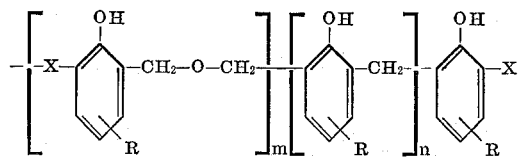

wherein R is hydrogen of a phenolic substituent meta to the hydroxyl group of the phenol, $m$ and $n$ are numbers the sum of which is at least 2, and the ratio of $m$-to-$n$ is at least 1, and wherein X is a hydrogen or a methylol group, the molar ratio of said methylol group-to-hydrogen being at least 1.

4. Process of claim 1 wherein the resin is heated at about 400° F.

5. Process of claim 1 wherein the resin is heated for a period of about 2 to 10 minutes.

6. Process of claim 2 wherein the basic catalyst has a $pk_b$ or $pk_a$ of about 4 to about 13.

7. Process of claim 1 wherein a compatible component selected from the group consisting of epoxy resins and rubbers is present.

8. Process of claim 7 wherein a strong acidic or basic catalyst is present in catalytic amounts.

9. Process of claim 3 further comprising an acidic or basic catalyst.

10. Process of claim 9 wherein the catalyst is a weak acid or weak base.

11. Process of claim 9 wherein the catalyst is a strong acid or strong base, and a compatible component selected from the group consisting of epoxy resins and rubbers is further present.

References Cited

UNITED STATES PATENTS

| | | | |
|---|---|---|---|
| 1,126,926 | 2/1915 | Wiechmann | 260—57 |
| 2,557,081 | 6/1951 | De Groote et al. | 252—331 |
| 3,409,571 | 11/1968 | Shepard et al. | 260—17.2 |
| 3,425,989 | 2/1969 | Shepard et al. | 260—55 |
| 3,303,332 | 4/1962 | Lombardi et al. | 260—831 |
| 3,028,251 | 4/1962 | Nagel | 117—21 |
| 3,324,197 | 6/1967 | Schwarzer | 260—831 |

OTHER REFERENCES

Journal of Applied Chemistry, vol. 7, 1957, pp. 676–700, Fraser et al.

American Chemical Society, Division of Organic Coatings and Plastic Chemistry, vol. 27, No. 1, pp. 115–124, Partansky, 1967.

WILLIAM H. SHORT, Primary Examiner

HOWARD SCHAIN, Assistant Examiner

U.S. Cl. X.R.

117—132, 161; 260—3, 33.4, 33.6, 52, 57, 844, 845